United States Patent
Kato

(10) Patent No.: US 7,034,911 B2
(45) Date of Patent: Apr. 25, 2006

(54) DISPLAY

(75) Inventor: Yoshifumi Kato, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 76 days.

(21) Appl. No.: 10/887,126

(22) Filed: Jul. 8, 2004

(65) Prior Publication Data

US 2005/0007518 A1    Jan. 13, 2005

(30) Foreign Application Priority Data

Jul. 10, 2003    (JP) .............................. 2003-195034

(51) Int. Cl.
*G02F 1/1335* (2006.01)
(52) U.S. Cl. ........................... 349/113; 349/70
(58) Field of Classification Search .................... None
See application file for complete search history.

(56) References Cited

U.S. PATENT DOCUMENTS

| | | | | |
|---|---|---|---|---|
| 6,268,843 | B1 | 7/2001 | Arakawa | 345/102 |
| 2001/0028335 | A1 | 10/2001 | Hasegawa et al. | 345/76 |
| 2002/0033908 | A1 | 3/2002 | Mori et al. | 349/61 |
| 2002/0145687 | A1* | 10/2002 | Mitsui et al. | 349/113 |
| 2002/0196387 | A1 | 12/2002 | Kimura | 349/61 |
| 2003/0099860 | A1 | 5/2003 | Lin et al. | 428/690 |

FOREIGN PATENT DOCUMENTS

| | | |
|---|---|---|
| EP | 1 380 879 A1 | 1/2004 |
| JP | 3-189627 | 9/1991 |
| JP | 5-34692 | 2/1993 |
| JP | 7-294916 | 11/1995 |
| JP | 8-211832 | 8/1996 |
| JP | 10-170918 | 6/1998 |
| JP | 2001-66593 | 3/2001 |
| WO | 01/42850 A1 | 6/2001 |
| WO | 03/048849 A1 | 6/2003 |

OTHER PUBLICATIONS

"Flat Panel Display Unabridged Dictionary," edited by Uchida Tatsuo and Hiraki Uchiike, published by Kabushiki Kaisha Kougyou Chousakai, Jan. 25, 2001, pp. 44 to 45, and p. 45 Fig. 2(b).
URL: http://www.ryutu.ncipi.go.jp/chart/kagaku4/frame.htm>; searched on Jun. 24, 2003.

* cited by examiner

*Primary Examiner*—James A. Dudek
(74) *Attorney, Agent, or Firm*—Morgan & Finnegan LLP

(57) ABSTRACT

A display for displaying a color image. A color filter is arranged facing towards a reflective display surface of a reflective liquid crystal panel. An organic EL panel is arranged between the color filter and the liquid crystal panel. The organic EL panel includes EL sub-pixels, which are luminescent and which are arranged in correspondence to liquid crystal sub-pixels of the liquid crystal panel. Each EL sub-pixel transmits light that is transmitted through regions of the color filter corresponding to the EL sub-pixels. A controller selectively drives at least one of the organic EL panel and the liquid crystal panel.

20 Claims, 3 Drawing Sheets

DISPLAY

BACKGROUND OF THE INVENTION

The present invention relates to a display including a liquid crystal panel, an electroluminescent panel, and a color filter that are laminated together.

Liquid crystal displays are widely used for portable devices, such as portable computers. To meet the demand for portable computers that are smaller, lighter, and consume less power, reflective crystal display panels that do not have light source units, such as backlights, are used in the prior art. A reflective crystal display panel adjusts the orientation of crystals to control the reflection or non-reflection of ambient light when displaying an image (refer to "Flat Panel Display Unabridged Dictionary," edited by Uchida Tatsuo and Hiraki Uchiike, published by Kabushiki Kaisha Kougyou Chousakai, Jan. 25, 2001, pp. 44 to 45, and p. 45 FIG. 2(b)).

Color displays using organic or inorganic electroluminescence (EL) devices have received wide attention due to their superior display properties (e.g., <URL: http://www.ryutu.ncipi.go.jp/chart/kagaku4/frame.htm>; searched on Jun. 24, 2003). An EL device emits light by itself. This enables the user of a portable device, which employs EL devices, to view an image even in dark places.

In the prior art, liquid crystal displays and EL displays both have disadvantages. For example, a reflective crystal display panel has satisfactory display properties under bright conditions, such as when the display is used outdoors during the daytime. However, display properties of the reflective crystal display panel are low under dark conditions, such as when the display is used during the nighttime or in a dark room. Furthermore, display properties of the liquid crystal panel with regard to fast moving images are inferior to that of other displays, such as EL displays.

A color display using organic EL devices has a disadvantage in that the contrast is low under bright conditions, such as when the display is used outdoors during the daytime. Thus, such conditions are not suitable for showing a high quality image on the color display.

SUMMARY OF THE INVENTION

It is an object of the present invention to provide a display that displays a color image in a manner suitable for the usage condition and usage purpose.

To achieve the above object, the present invention provides, a display provided with a reflective liquid crystal panel including a display surface and a plurality of liquid crystal sub-pixels. An electroluminescence panel is arranged at a side of the display surface of the reflective liquid crystal display panel. The electroluminescence panel includes a plurality of electroluminescence sub-pixels, each corresponding to one of the liquid crystal sub-pixels. Each of the electroluminescence sub-pixels emits at least white light. A color filter is arranged at the side of the display surface of the reflective liquid crystal display panel and arranged farther from the display surface than the electroluminescence panel. The color filter includes a plurality of regions, each corresponding to one of the electroluminescence sub-pixels. Each of the electroluminescence sub-pixels transmits light having a wavelength that enables transmission through the corresponding region of the color filter. A liquid crystal panel driver drives the liquid crystal panel. An EL panel driver drives the electroluminescence panel. A selecting means selects at least one of the liquid crystal panel driver and the EL panel driver to display an image.

A further aspect of the present is a display provided with a reflective liquid crystal panel including a display surface and a plurality of liquid crystal sub-pixels. An electroluminescence panel is arranged at a side of the display surface of the reflective liquid crystal display panel. The electroluminescence panel includes a plurality of electroluminescence sub-pixels, each corresponding to one of the liquid crystal sub-pixels. A color filter is arranged at the side of the display surface of the reflective liquid crystal display panel and arranged farther from the display surface than the electroluminescence panel. The color filter includes a plurality of regions, each corresponding to one of the electroluminescence sub-pixels. Each of the electroluminescence sub-pixels transmits light having a wavelength that enables transmission through the corresponding region of the color filter and at least functions to emit light having said wavelength. A liquid crystal panel driver drives the liquid crystal panel. An EL panel driver drives the electroluminescence panel. A selecting means selects at least one of the liquid crystal panel driver and the EL panel driver to display an image.

A further aspect of the present invention is a display provided with a reflective liquid crystal panel including a display surface and a plurality of liquid crystal sub-pixels. An electroluminescence panel is arranged parallel to the reflective liquid crystal display panel. The electroluminescence panel includes a color filter having a plurality of regions, each corresponding to one of the liquid crystal sub-pixels. The electroluminescence panel further includes a plurality of electroluminescence sub-pixels, each corresponding to one of the regions of the color filter and arranged between the liquid crystal sub-pixels and the color filter. Each of the electroluminescence sub-pixels transmits light having a wavelength that enables transmission through the corresponding region of the color filter. A liquid crystal panel driver drives the liquid crystal panel. An EL panel driver drives the electroluminescence panel. A controller selectively activates at least one of the liquid crystal panel driver and the EL panel driver to display an image.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A display 11 according to a first embodiment of the present invention will now be discussed with reference to FIGS. 1 to 5. The dimension of each member relative to that of other members is shown differently from the actual dimensions in FIGS. 1 and 2.

Figure 1:
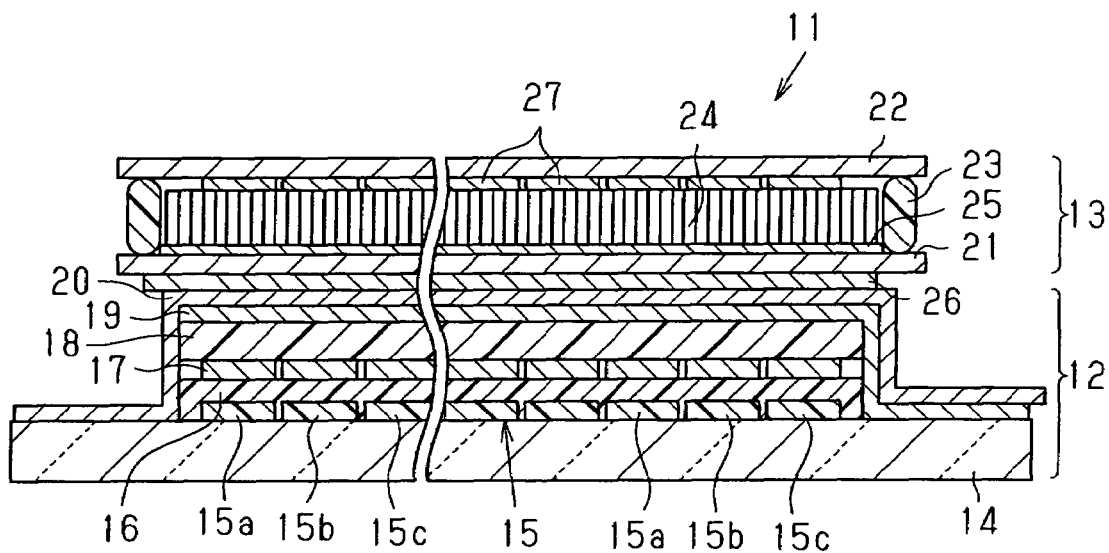
FIG. 1 is a cross-sectional view showing a display according to a preferred embodiment of the present invention.

Referring to FIG. 1, the display 11 emits light downward as viewed in FIG. 1. The display 11 includes a liquid crystal panel 13 and an organic EL panel 12, which is located under the liquid crystal panel 13. The organic EL panel 12 and the liquid crystal panel 13 are both formed in units. For example, the organic EL panel 12 is a passive matrix drive type panel and the liquid crystal panel 13 is a passive matrix drive type reflective panel.

The organic EL panel 12 includes a transparent glass substrate 14. A color filter 15, a smoothing film 16, a plurality of first electrodes (row electrodes) 17, an organic EL layer 18, a plurality of second electrodes (column electrodes) 19, and a passivation film 20 are superimposed on the substrate 14. The color filter 15 includes red regions 15a corresponding to red (R), green regions 15b corresponding to green (G), and blue regions 15c corresponding to blue (B). The red regions 15a, the green regions 15b, and the blue regions 15c are formed as parallel strips. In this specification, the term "transparent" refers a property enabling the transmission of light in a predetermined wavelength band.

Each first electrode 17 is a strip facing towards one of the regions 15a to 15c. The organic EL layer 18 includes a plurality of strip regions extending in a direction orthogonal to the first electrodes 17. An insulation barrier (not shown) is arranged between the first electrodes 17 and the organic EL layer 18. The second electrodes 19 are superimposed on the organic EL layer 18. The intersections of the first electrodes 17 and the second electrodes 19 serve as sub-pixels (EL sub-pixels) of the organic EL panel 12. When viewed from the substrate 14, the EL sub-pixels are arranged in a matrix. White light emitted from the organic EL layer 18 is transmitted through the regions 15a to 15c to obtain the corresponding color. In this manner, an EL pixel formed from the three EL sub-pixels of red (R), green (G), and blue (B) generates the desired color. The term "sub-pixel" refers to the smallest unit forming an image.

The passivation film 20 covers the surfaces of the first electrodes 17, the organic EL layer 18, and the second electrodes 19 that are not in contact with one another in addition to the surfaces of the first electrodes 17 that are not in contact with the smoothing film 16 (in FIG. 1, the side surfaces of the first electrodes 17, the side surfaces of the organic EL layer 18, and the side surfaces and upper surfaces of the second electrode 19.

The first electrodes 17 and the second electrodes 19 can be known transparent electrodes used for organic EL devices and can be made of indium tin oxide (ITO) or indium zinc oxide (IZO). The first electrodes 17 serve as anodes, and the second electrodes 19 serve as cathodes.

The configuration of the organic EL layer 18 is as known in the prior art. For example, the organic EL layer 18 includes from the side closer to the first electrodes 17, the three layers of a hole injection layer, a luminescence layer, and an electron injection layer, or the five layers of a hole injection layer, a hole transport layer, a luminescence layer, an electron transport layer, and an electron injection layer. The luminescence layer emits a white color. The organic EL layer 18 is transparent like the first electrodes 17 and the second electrodes 19. Accordingly, the EL sub-pixels have light permeability with respect to at least the light that is transmitted through the corresponding regions 15a to 15c.

The passivation film 20 is transparent and functions to inhibit the passage of at least moisture (water vapor). The passivation film 20 is made of silicon nitride.

The liquid crystal panel 13 includes two sheets of transparent substrates 21 and 22. The two substrates 21 and 22 are bonded to each other with a predetermined space in between. The space between the substrates 21 and 22 contains liquid crystal 24 and is sealed by a seal 23. The substrates 21 and 22 are made of, for example, glass. Referring to the lower substrate 21, which is arranged closer to the organic EL panel 12, a plurality of transparent electrodes (column electrodes) 25 are formed on the side facing towards the liquid crystal 24. Further, a polarization plate 26 is formed on the opposite side of the lower substrate 21. The transparent electrodes 25 are formed as parallel strips associated with the second electrodes 19.

A plurality of reflective electrodes (row electrodes) 27 are formed on the upper substrate 22 on the surface facing towards the liquid crystal 24. The reflective electrodes 27 extend orthogonal to the transparent electrodes 25. The transparent electrodes 25 are made of indium tin oxide (ITO). The reflective electrodes 27 are made of a metal, such as aluminum. The intersections of the transparent electrodes 25 and the reflective electrodes 27 serve as sub-pixels (liquid crystal sub-pixels) of the liquid crystal panel 13. When the display 11 is viewed from the substrate 14, the liquid crystal sub-pixels are arranged in a matrix and overlapped with the EL sub-pixels. That is, the EL sub-pixels are formed on the organic EL panel 12 in correspondence to the liquid crystal sub-pixels. Each EL sub-pixel has light permeability with respect to at least the light that is transmitted through the corresponding region 15a, 15b, or 15c of the color filter 15 and emits a white color. Light reflected by the reflective electrodes 27 and transmitted through the liquid crystal sub-pixels pass through the organic EL panel 12 and the regions 15a to 15c and then is emitted from the substrate 14. The liquid crystal sub-pixels serve as shutters that control the reflected amount of light (reflection/non-reflection) in the liquid crystal panel 13.

The liquid crystal panel 13 is a normally white type. More specifically, light is reflected by the reflective electrodes 27 and transmitted through the liquid crystal 24, which is sealed between the substrates 21 and 22. Then, when voltage is not applied between the transparent electrodes 25 and the reflective electrodes 27, the light is transmitted through the polarization plate 26. The application of voltage between the transparent electrodes 25 and the reflective electrodes 27 decreases the amount of light transmitted through the polarization plate 26. When the applied voltage reaches a predetermined value, the polarization plate 26 blocks the transmission of light. The liquid crystal panel 13 is white (white display state) when voltage is not applied between the transparent electrodes 25 and the reflective electrodes 27. The application of voltage decreases the light transmittance of the polarization plate 26. The liquid crystal panel 13 is black (black display state) when voltage having the predetermined value is applied between the transparent electrodes 25 and the reflective electrodes 27.

Figure 2:
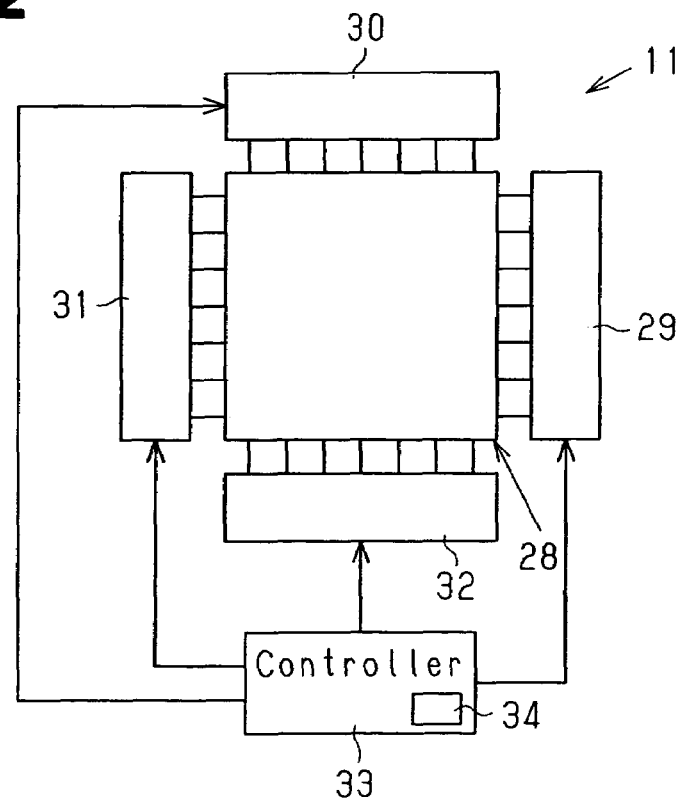
FIG. 2 is a schematic diagram showing a drive circuit of a display section in the display of FIG. 1.

Referring to FIG. 2, a first electrode driver 29, which supplies the first electrodes 17 with drive voltage, and a second electrode driver 30, which supplies the second electrodes 19 with drive voltage, is arranged outside a display section 28, which is defined by the organic EL panel 12 and the liquid crystal panel 13. The first electrode driver 29 and the second electrode driver 30 serve as an EL panel driver for displaying an image on the organic EL panel 12. Further, a transparent electrode driver 31, which supplies the transparent electrodes 25 with drive voltage, and a reflective electrode driver 32, which supplies the reflective electrodes 27 with drive voltage, is arranged outside the display section 28. The transparent electrode driver 31 and the reflective electrode driver 32 serve as a liquid crystal panel driver for displaying an image on the liquid crystal panel 13. A controller 33 provides a drive control signal to each of the drivers 29 to 32.

The controller 33 drives the organic EL panel 12 and the liquid crystal panel 13 in a plurality of display modes. The controller 33 includes an input device 34. The controller 33 determines the display mode in accordance with a command signal input through the input device 34. Then, the controller 33 provides each of the drivers 29 to 32 with a control signal to drive the organic EL panel 12 and the liquid crystal panel 13 in that display mode. The controller 33 and the input device 34 serve as a selecting means for determining whether to use the EL panel driver and/or the liquid crystal panel driver to display an image.

The display modes include an EL display mode, a liquid crystal display mode, and an EL and liquid crystal synchronization display mode. In the EL display mode, the controller 33 uses the EL panel driver (the first electrode driver 29 and the second electrode driver 30) to display an image. Further, the controller 33 uses the liquid crystal panel driver (the drivers 31 and 32) to hold the liquid crystal panel 13 in the white display state or the black display state. When doing so, the controller 33 refers to the command signal input through the input device 34 to determine whether to hold the liquid crystal panel 13 in the white display state or the black display state. In other words, the EL display mode is further divided into two modes, one for holding the liquid crystal panel 13 in the black display state and the other for holding the liquid crystal panel 13 in the white display state.

In the liquid crystal display mode, the controller 33 uses the liquid crystal panel driver (the transparent electrode driver 31 and the reflective electrode driver 32) to display an image. Further, the controller 33 uses the EL panel driver (the first electrode driver 29 and the second electrode driver 30) to hold the organic EL panel 12 in a non-luminescent state.

In the EL and liquid crystal synchronization display mode, the controller 33 controls each of the drivers 29 to 32 to synchronously drive the organic EL panel 12 and the liquid crystal panel 13 using the passive matrix drive technique. In the EL and liquid crystal synchronization display mode, the controller 33 uses the EL panel driver (the first electrode driver 29 and the second electrode driver 30) to display an image and synchronously controls the liquid crystal panel driver (the transparent electrode driver 31 and the reflective electrode driver 32) so that the liquid crystal panel 13 enters the white display state or the black display state. The controller 33 controls the liquid crystal panel driver so that the liquid crystal sub-pixels enter the white display state when the corresponding EL sub-pixels are luminescent and enter a black display state when the corresponding EL sub-pixels are non-luminescent.

The operation of the display 11 will now be described.

When the display 11 is activated and an image is shown on a display screen of the display section 28, the controller 33 provides a command signal to the drivers 29 to 32 to enter the display mode that is input through the input device 34.

The EL display mode is suitable when the display 11 is used during the nighttime or in a dark room or when displaying a moving image. The crystal liquid display mode is suitable when the display 11 is used under bright conditions, such as outdoors during the daytime. The EL and liquid crystal synchronous display mode is more suitable than the EL display mode when displaying an image having a higher contrast.

In the EL display mode, the controller 33 determines whether to have the liquid crystal panel 13 enter the white display state or the black display state. Since the liquid crystal panel 13 is normally white, when entering the white display state, the controller 33 provides command signals to the transparent electrode driver 31 and the reflective electrode driver 32 to maintain a state in which voltage is not applied between all of the transparent electrodes 25 and the reflective electrodes 27. As a result, each of the liquid crystal sub-pixels enter the white display state in which the transmittance of the polarization plate 26 becomes maximum with respect to light that enters the liquid crystal 24 and is reflected by the reflective electrodes 27.

Figure 3:
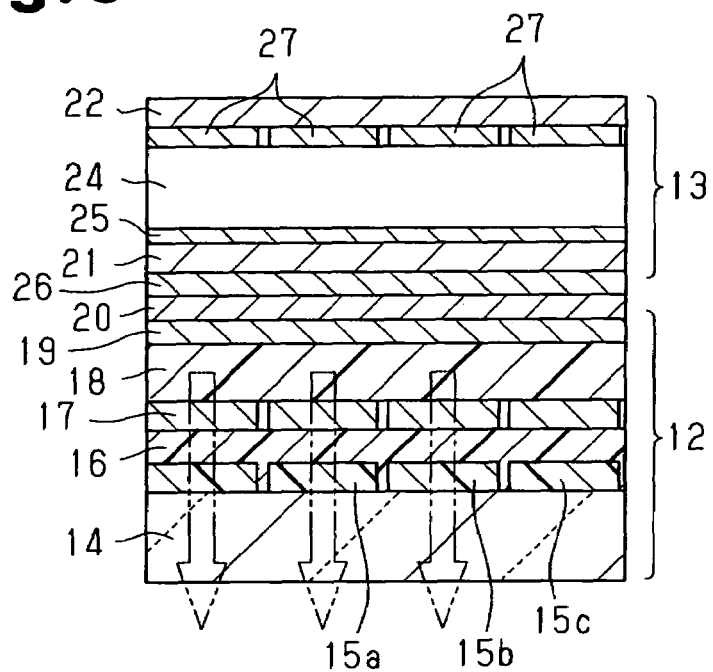
FIGS. 3 to 5 are cross-sectional views showing the operation of the display shown in FIG. 1.

In this state, the controller 33 provides command signals to the first electrode driver 29 and the second electrode driver 30 of the organic EL panel 12 so that the first electrodes 17 and the second electrodes 19 are driven in accordance with the passive matrix drive technique. Voltage is applied to the first electrodes 17 and the second electrodes 19 so that the organic EL layer 18 emits white light from the intersection between the first electrodes 17 and the second electrodes 19. Among the light rays emitted from the organic EL layer 18, the light rays directed toward the substrate 14, as shown by the arrows in FIG. 3, are transmitted through the regions 15a to 15c and emitted from the substrate 14 as light colored in accordance with the corresponding regions 15a to 15c. Further, among the light rays emitted from the organic EL layer 18, the light rays directed toward the liquid crystal panel 13 are transmitted through the second electrodes 19, the passivation film 20, the polarization plate 26, the substrate 21, the transparent electrodes 25, and the liquid crystal 24. The light rays are then reflected by the reflective electrodes 27, transmitted through the liquid crystal 24, the organic EL layer 18, the color filter 15, etc. and emitted out of the substrate 14. This increases the brightness of the display 11. Ambient light rays entering the EL sub-pixels corresponding to portions of the organic EL layer in a non-luminescent state are also reflected by the reflective electrodes 27 and emitted out of the substrate 14.

When entering the black display state, the controller 33 provides command signals to the transparent electrode driver 31 and the reflective electrode driver 32 to maintain a state in which a predetermined voltage is applied between all of the transparent electrodes 25 and the reflective electrodes 27. As a result, each of the liquid crystal sub-pixels are held in the black display state in which the polarization plate 26 blocks the light entering the liquid crystal 24 that is reflected by the reflective electrodes 27.

Among the rays of white light generated at the intersections of the first and second electrodes 17 and 19, to which voltage is applied, and emitted from the organic EL layer 18, only the light rays directed straight toward the substrate 14 are emitted out of the substrate 14. EL sub-pixels other than those that are in a luminescent state do not emit the reflection of ambient light. This enables the display of an image having a higher contrast than when the organic EL panel 12 or the liquid crystal panel 13 is independently driven to display an image.

Figure 4:
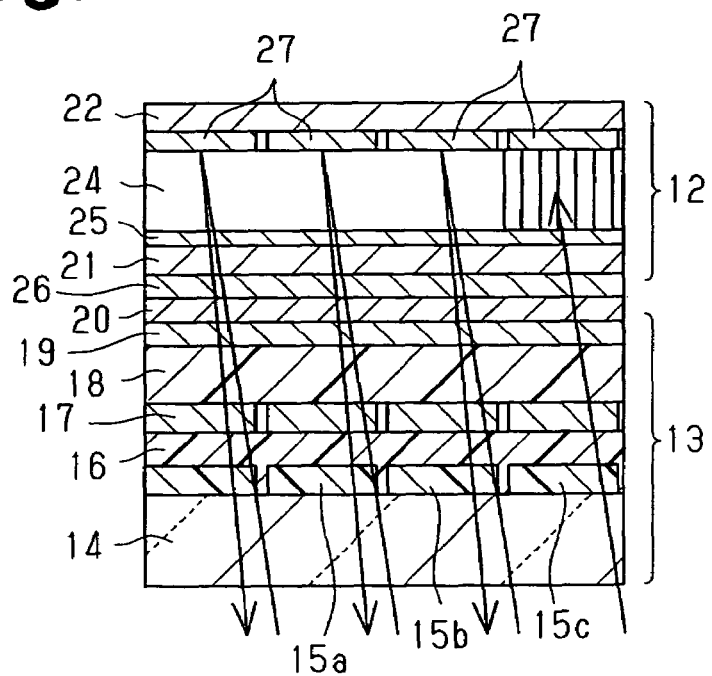

In the liquid crystal display mode, the drivers 29 to 32 are controlled so that the liquid crystal panel 13 is driven with the passive matrix drive technique while the organic EL panel 12 is held in a non-luminescent state. That is, the controller 33 provides command signals to the first electrode driver 29 and the second electrode driver 30 to hold a state in which voltage is not applied between the first electrodes 17 and the second electrodes 19. The controller 33 further provides command signals to the transparent electrode driver 31 and the reflective electrode driver 32 of the liquid crystal panel 13 to drive the transparent electrodes 25 and the reflective electrodes 27 with the passive matrix drive technique. Referring to FIG. 4, the liquid crystal 24 at the intersections between the transparent electrodes 25 and the reflective electrodes 27 to which voltage is applied are held in a state in which the light reflected by the reflective electrodes 27 and transmitted through the liquid crystal 24 passes through the polarization plate 26. As a result, the liquid crystal panel 13 uses bright ambient light as a light source to display an image with satisfactory visual appearance.

In the EL and liquid crystal synchronization display mode, the controller 33 provides command signals to the first electrode driver 29 and the second electrode driver 30 of the organic EL panel 12 so that the first electrodes 17 and the second electrodes 19 are driven with the passive matrix drive technique. The liquid crystal panel 13 at the intersections of the first electrodes 17 and the second electrodes 19 to which voltage is applied emits a white light. Further, the controller 33 provides commands to the transparent electrode driver 31 and the reflective electrode driver 32 of the liquid crystal panel 13 to drive the transparent electrodes 25 and the reflective electrodes 27 with the passive matrix drive technique. Light reflected by the reflective electrodes 27 is transmitted through the liquid crystal 24. When the light is transmitted through the liquid crystal sub-pixels corresponding to the EL sub-pixels that emit white light, the light is further transmitted through the polarization plate 26. When the light is transmitted through the liquid crystal pixels corresponding to the EL sub-pixels that are in a non-luminescent state, the light is blocked by the polarization plate 26.

Figure 5:
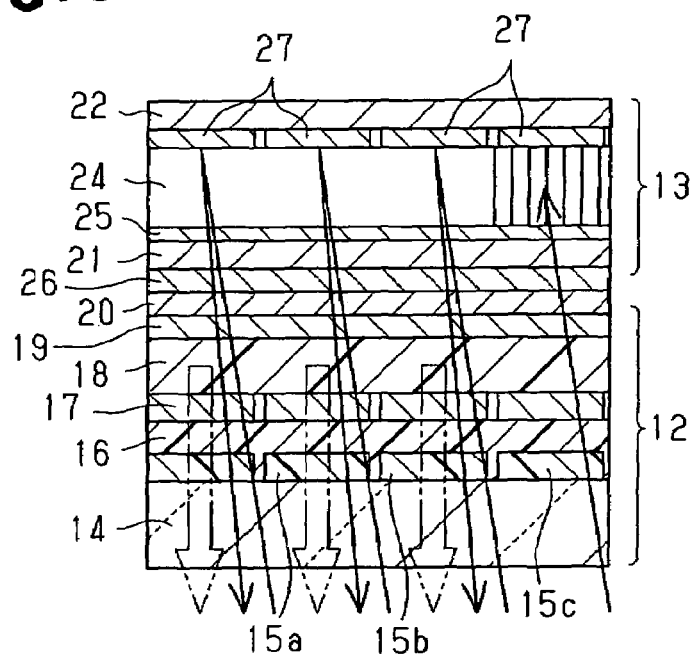

Accordingly, referring to FIG. 5, white light (indicated by wide arrows), which is emitted from the organic EL layer 18, and ambient light (indicated by narrow arrows), which passes through the luminescent EL sub-pixels and enters the liquid crystal panel 13 to be reflected by the reflective electrodes 27, pass through the regions 15a to 15c that are corresponding to the luminescent EL sub-pixels and are emitted toward the substrate 14. The white light of the organic EL layer 18 includes light rays emitted straight toward the color filter 15 and the reflection of light rays emitted toward the liquid crystal panel 13 and reflected by the reflective electrodes 27. As a result, in the EL and liquid crystal synchronization display mode, in comparison to when the liquid crystal panel 13 is in the black display state during the EL display mode, an image having a higher contrast is displayed.

The first embodiment has the advantages described below.

(1) The display 11 utilizes the advantages of organic EL devices and crystal display devices to display a color image in a manner suitable for the usage condition and usage purpose. The display 11 has a configuration in which the organic EL panel 12 and the color filter 15 are arranged at the display surface side of the reflective liquid crystal panel 13. The display 11 includes the liquid crystal panel driver for displaying an image on the liquid crystal panel 13 and the EL panel driver for displaying an image on the organic EL panel 12. The selecting means determines which driver(s) should be used when displaying an image. Thus, the display 11 has the advantages of both organic EL devices and crystal display devices.

Under bright conditions, such as when the display 11 is used outdoors during the daytime, the selecting means does not have the electroluminescence panel 12 emit light and drives the liquid crystal driver to display an image on the liquid crystal panel 13. This reduces power consumption without wasting power and enables the display of a sharp image. When the display 11 is used during the nighttime or in a dark room, the selecting means drives the EL panel driver to display an image on the organic EL panel 12. This enables the display of a sharp image even when the display 11 is not used under bright conditions. That is, the display 11 may be used under any condition (brightness). When displaying a moving image, a fast moving image may be properly displayed by displaying the image on the organic EL, panel 12.

(2) The organic EL layer 18 forming the EL sub pixels does not have to include a red luminescence layer, a green luminescence layer, and a blue luminescence layer. This facilitates the manufacturing of the display 11 in comparison to when the organic EL layer 18 is required to include red, green, and blue luminescence layers.

(3) When displaying an image on the liquid crystal panel 13, the EL panel driver may drive the organic EL panel 12 synchronously with the liquid crystal panel 13 to display an image having a high contrast. Further, in comparison to a display that uses organic EL devices as a backlight or a front light, the display 11 reduces power consumption. This is because only the EL sub-pixels emit light that are corresponding to the liquid crystal sub-pixels that transmit light.

(4) When using the EL panel driver to display an image on the organic EL panel 12, the image may be displayed in a state in which the luminance of the entire display section 28 is high or in a state in which the contrast is high. When the liquid crystal panel driver holds the liquid crystal panel 13 in the white display state, the amount of ambient light and light emitted from the organic EL layer 18 toward the liquid crystal 24 that are reflected by the liquid crystal panel 13 and emitted toward the substrate 14 increases. This raises the luminance in comparison to when the liquid crystal panel 13 is in a black display state. Further, when the liquid crystal panel 13 is held in a black display state by the liquid crystal panel driver, ambient light and light emitted from the organic EL layer 18 towards the liquid crystal 24 is suppressed or prevented from being reflected by the liquid crystal panel 13 and returned toward the organic EL panel. This increases the contrast.

(5) In comparison to when the liquid crystal panel 13 is normally black, images are displayed with a higher contrast in this embodiment. Since the liquid crystal panel 13 is normally white, the application of voltage holds the liquid crystal panel 13 in a black display state. This displays black images more sharply in comparison to when the liquid crystal panel 13 is normally black.

(6) Freedom of layout for manufacturing the display 11 is increased. The organic EL panel 12 is formed in a unit that includes the color filter, and the liquid crystal panel 13 is formed in a unit. This enables the display 11 to be manufactured by joining the separately formed organic EL panel 12 and liquid crystal panel 13.

(7) When displaying an image only with the organic EL panel 12, images are easier to view in comparison to when the liquid crystal panel 13 is arranged on the display surface side of the organic EL panel 12. This is because the organic EL panel 12 is arranged closer to the display surface than the liquid crystal panel 13.

(8) In comparison to when one of the organic EL panel 12 and the liquid crystal panel 13 is driven in accordance with the passive matrix drive technique and the other one of the panels 12 and 13 is driven in accordance with the active matrix drive technique, the controlling of the display 11 is facilitated. Since the organic EL panel 12 and the liquid crystal panel 13 are both driven in accordance with the passive matrix drive technique, the same control signals may be used when synchronizing the two panels 12 and 13.

(9) A switch does not have to be arranged near each sub-pixel of the organic EL panel 12 to control the application of voltage. This is because the organic EL panel 12 is driven in accordance with the passive matrix drive technique.

The first embodiment may be modified as described below. Further, the following modifications may be combined with one another.

When using the EL panel driver to display an image on the organic EL panel 12, the liquid crystal panel driver may cause the liquid crystal panel 13 to enter a white display state or a black display state in synchronism with the organic EL panel 12. For example, the transparent electrode driver 31 and the reflective electrode driver 32 may be controlled so that the liquid crystal sub-pixels corresponding to luminescent EL sub-pixels are held in a white display state while the liquid crystal sub-pixels corresponding to non-luminescent EL sub-pixels are held in a black display state. This improves the luminance of the display surface and improves the contrast.

The display mode of the display 11 does not necessarily have to be selected by a command signal input to the controller 33 when a user of the display 11 operates the input device 34. For example, a sensor may be used to measure the luminance outside the display 11 (preferably at the display surface). When the luminance is greater than or equal to a threshold value, the display 11 enters a display mode that holds the organic EL panel 12 in a non-luminescent state. In this case, images are displayed without consuming unnecessary power even if the user does not determine the display mode.

When displaying a moving image, the image may be displayed on the organic EL panel 12 by automatically using the EL panel driver. Further, a moving image may be displayed with a high contrast. That is, liquid crystal sub-pixels corresponding to luminescent EL sub-pixels are held in a white display state, and liquid crystal sub-pixels corresponding to non-luminescent EL sub-pixels are held in a black display state. This improves the display capacity of moving images.

In the above configuration in which the display mode is automatically set, the display mode may still be input with the input device 34 to display an image in accordance with the display mode that is input by the input device 34. Further, the display 11 may includes a configuration for selecting either the display mode input through the input device 34 or the display mode automatically set by the controller 33. For example, a switch may be used to select either one of the modes. This would increase the freedom of display mode selection.

The liquid crystal panel 13 does not have to be normally white and may be normally black. In such a case, when using the EL panel driver to display an image on the organic EL panel 12, power consumption is reduced when holding the liquid crystal panel 13 in a black display state in comparison to when the liquid crystal panel 13 is normally white.

The organic EL panel 12 and the liquid crystal panel 13 do not have to be driven in accordance with the passive matrix drive technique. For example, the organic EL panel 12 may be driven in accordance with the passive matrix drive technique, and the liquid crystal panel 13 may be driven in accordance with the active matrix drive technique. Alternatively, the organic EL panel 12 and the liquid crystal panel 13 may both be driven in accordance with the active matrix drive technique.

The passivation film 20 does not have to be made of silicon nitride and may be made of other transparent materials that have low permeability with respect to moisture and gas, such as oxygen. For example, silicon oxide or diamond-like carbon may be used. Further, in addition to forming the passivation film 20 with a vapor deposition film of silicon nitride, silicon oxide, or diamond-like carbon, the passivation film 20 may be formed by applying polysilazane.

Figure 6:
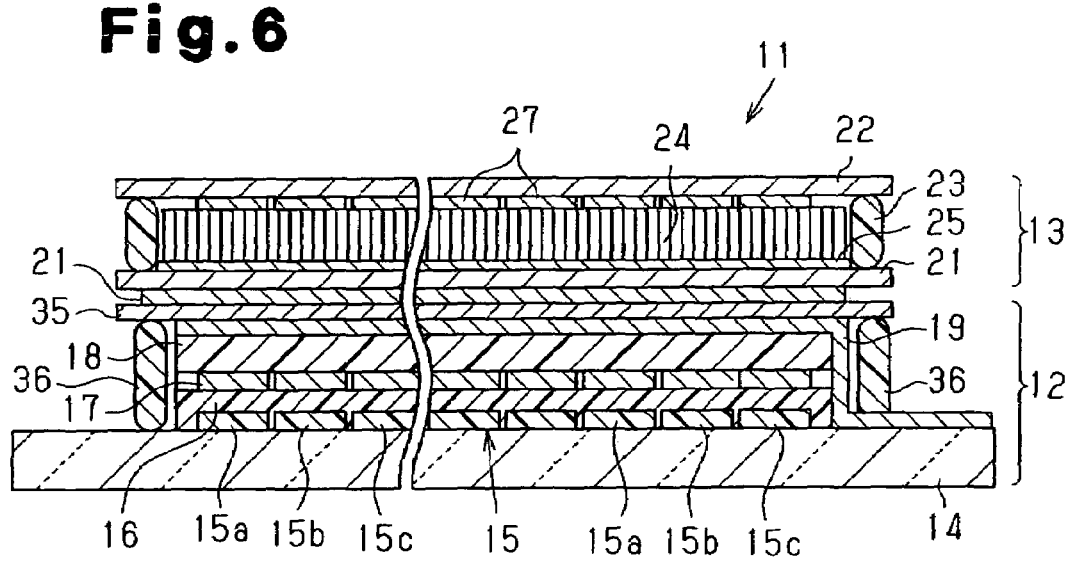
FIG. 6 is a cross-sectional diagram showing a display according to a further embodiment of the present invention.

Referring to FIG. 6, instead of forming the passivation film 20 to protect the organic EL layer 18 from external moisture and oxygen, a transparent substrate 35 may be formed on the second electrodes 19 facing away from the organic EL layer 18. Further, the substrate 35 and the substrate 14 may be bonded by a seal 36 to protect the organic EL layer 18 from moisture and oxygen. A glass substrate may be used as the substrate 35, and epoxy resin may be used as the material of the seal 36. In this case, the organic EL panel 12 and the liquid crystal panel 13 are produced separately and then joined together to manufacture the display 11.

To protect the organic EL layer 18 from external moisture and oxygen, a seal can (seal cover) may be used in lieu of the passivation film 20. For example, a glass cover that enables the transmission of at least the light transmitted through the color filter 15 may be fixed to the substrate 14 with a sealing agent so as to cover the color filter 15, the smoothing film 16, the first electrodes 17, the organic EL layer 18, and the second electrodes 19.

The EL sub-pixels and the liquid crystal sub-pixels do not have to be formed as parallel strips and may have a honeycomb structure. In this case, the regions 15a to 15c of the color filter 15 are arranged and shaped in accordance with the shape and arrangement of the EL sub-pixels and the liquid crystal sub-pixels.

The color filter 15 does not have to be formed by the strips of the red regions 15a, the green regions 15b, and the blue regions 15c. For example, the red regions 15a, the green regions 15b, and the blue regions 15c may be arranged so that regions of the same color are lined diagonally to form a so-called mosaic array. Alternatively, the red regions 15a, the green regions 15b, and the blue regions 15c may be arranged in a triangular manner to form a so-called delta array. The shape of each of the regions 15a, 15b, and 15c does not have to be rectangular and may be hexagonal.

The first electrodes 17 located closer to the substrate 14 may be used as cathodes, and the second electrodes 19 may be used as anodes. In this case, the configuration of the organic EL layer 18 is changed accordingly. For example, the organic EL layer may include from the side closer to the first electrodes 17 the three layers of an electron injection layer, a luminescence layer, and a hole injection layer, or the five layers of an electron injection layer, an electron transport layer, a luminescence layer, a hole transport layer, and a hole injection layer.

The first electrodes 17 and the second electrodes 19 may be formed from a thin metal layer that is transparent instead of being formed from a conductive transparent material. In this case, the term thin refers to a thickness of 50 nm or less, preferably in the range of 0.5 to 20 nm.

Instead of selectively holding the liquid crystal panel 13 in the white display state or the black display state in the EL display mode, the liquid crystal panel 13 may be held only in either one of the white display state or the black display state in the EL display mode.

In the EL and liquid crystal synchronization display mode, instead of the polarization plate 26 blocking light rays, which are reflected by the reflective electrodes 27 and transmitted in the liquid crystal 24 through the liquid crystal sub-pixels corresponding to non-luminescent EL sub-pixels, the polarization plate 26 may transmit some of such light rays. In this case, the liquid crystal sub-pixels corresponding to non-luminescent EL sub-pixels are held in a gray display state, which is between the white display state and the black display state. Depending on the color of the luminescence portion, the contrast may be higher when the background is gray instead of black. Thus, depending on the color that is to be displayed, the voltage applied to the transparent electrodes 25 and the reflective electrodes 27 of the liquid crystal sub-pixels corresponding to the non-luminescent portion that becomes the background may be adjusted.

Instead of aluminum, the reflective electrodes 27 may be made of chromium, nickel, or silver.

Transparent electrodes may be used in lieu of the reflective electrodes 27. In this case, a reflective surface is provided on the substrate 22 or a reflective plate is arranged at the outer side of the substrate 22.

Instead of the organic EL panel 12, an inorganic EL panel may be used. In this case, the voltage applied to emit light is greater in comparison to that applied to the organic EL panel 12. However, the advantages of EL devices and liquid crystal devices may be used to display a color image that is suitable for the usage condition or purpose.

A display according to a second embodiment of the present invention will now be discussed.

The display of the second embodiment differs from that of the first embodiment in the following points.

The sub-pixels of the organic EL sub-pixels (EL sub-pixels) emit at least light having a wavelength in the transmission wavelength range of the associated color filter.

The EL sub-pixels are each transparent to at least light having a wavelength in the transmission wavelength range of the associated color filter.

The wavelength of the light emitted by the EL panel is appropriately set by changing the material of the luminescence layer, changing the layer configuration, changing the film thickness, or by including a color conversion member.

The second embodiment obtains advantages (1) and (3) to (9) of the first embodiment.

The second embodiment may be modified in the same manner as the first embodiment.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A display comprising:
    a reflective liquid crystal panel including a display surface and a plurality of liquid crystal sub-pixels;
    an electroluminescence panel arranged at a side of the display surface of the reflective liquid crystal display panel, the electroluminescence panel including a plurality of electroluminescence sub-pixels, each corresponding to one of the liquid crystal sub-pixels, wherein each of the electroluminescence sub-pixels emits white light;
    a color filter arranged at the side of the display surface of the reflective liquid crystal display panel and arranged farther from the display surface than the electroluminescence panel, the color filter including a plurality of regions, each corresponding to one of the electroluminescence sub-pixels, wherein each of the electroluminescence sub-pixels transmits at least light having a wavelength that enables transmission through the corresponding region of the color filter;
    a liquid crystal panel driver for driving the liquid crystal panel;
    an EL panel driver for driving the electroluminescence panel; and
    a selecting means for selecting at least one of the liquid crystal panel driver and the EL panel driver to display an image.

2. The display according to claim 1, wherein the selecting means selects whether to have the EL panel driver hold the electroluminescence panel in a non-luminescent state or drive the EL panel in synchronism with the liquid crystal panel when displaying an image with the liquid crystal panel driver.

3. The display according to claim 1, wherein the selecting means selects whether to have the liquid crystal panel driver hold the liquid crystal panel in a white display state or a black display state when displaying an image with the EL panel driver.

4. The display according to claim 1, wherein the selecting means has the liquid crystal panel driver hold the liquid crystal panel in a white display state or a black display state in synchronism with the electroluminescence panel when displaying an image with the EL panel driver.

5. The display according to claim 1, wherein the liquid crystal panel is normally white.

6. The display according to claim 1, wherein the electroluminescence panel is an organic electroluminescence panel.

7. A display comprising:
    a reflective liquid crystal panel including a display surface and a plurality of liquid crystal sub-pixels;
    an electroluminescence panel arranged at a side of the display surface of the reflective liquid crystal display panel, the electroluminescence panel including a plurality of electroluminescence sub-pixels, each corresponding to one of the liquid crystal sub-pixels;
    a color filter arranged at the side of the display surface of the reflective liquid crystal display panel and arranged farther from the display surface than the electroluminescence panel, the color filter including a plurality of regions, each corresponding to one of the electroluminescence sub-pixels, wherein each of the electroluminescence sub-pixels transmits at least light having a wavelength that enables transmission through the corresponding region of the color filter and at least functions to emit light having said wavelength;
    a liquid crystal panel driver for driving the liquid crystal panel;
    an EL panel driver for driving the electroluminescence panel; and
    a selecting means for selecting at least one of the liquid crystal panel driver and the EL panel driver to display an image.

8. The display according to claim 7, wherein the selecting means selects whether to have the EL panel driver hold the electroluminescence panel in a non-luminescent state or drive the EL panel in synchronism with the liquid crystal panel when displaying an image with the liquid crystal panel driver.

9. The display according to claim 7, wherein the selecting means selects whether to have the liquid crystal panel driver hold the liquid crystal panel in a white display state or a black display state when displaying an image with the EL panel driver.

10. The display according to claim 7, wherein the selecting means has the liquid crystal panel driver hold the liquid crystal panel in a white display state or a black display state in synchronism with the electroluminescence panel when displaying an image with the EL panel driver.

11. The display according to claim 7, wherein the liquid crystal panel is normally white.

12. The display according to claim 7, wherein the electroluminescence panel is an organic electroluminescence panel.

13. A display comprising:
   a reflective liquid crystal panel including a display surface and a plurality of liquid crystal sub-pixels;
   an electroluminescence panel arranged parallel to the reflective liquid crystal display panel, the electroluminescence panel including:
      a color filter having a plurality of regions, each corresponding to one of the liquid crystal sub-pixels; and
      a plurality of electroluminescence sub-pixels, each corresponding to one of the regions of the color filter and arranged between the liquid crystal sub-pixels and the color filter, wherein each of the electroluminescence sub-pixels transmits at least light having a wavelength that enables transmission through the corresponding region of the color filter;
   a liquid crystal panel driver for driving the liquid crystal panel;
   an EL panel driver for driving the electroluminescence panel; and
   a controller for selectively activating at least one of the liquid crystal panel driver and the EL panel driver to display an image.

14. The display according to claim 13, wherein each of the electroluminescence sub-pixels emits white light.

15. The display according to claim 13, wherein each of the electroluminescence sub-pixels emits light having a wavelength that is the same as that of light transmitted through the associated color filter.

16. The display according to claim 13, wherein the controller inactivates the EL panel driver to hold the electroluminescence panel in a non-luminescent state when activating the liquid crystal panel driver to display an image.

17. The display according to claim 13, wherein the controller activates the liquid crystal panel driver and the EL panel driver to synchronously drive the liquid crystal sub-pixels and the electroluminescence sub-pixels.

18. The display according to claim 17, wherein the electroluminescence sub-pixels includes a first electroluminescence sub-pixel that is in a luminescent state and a second electroluminescence sub-pixel that is in a non-luminescent state, wherein the controller controls a first liquid crystal sub-pixel corresponding to the first electroluminescence sub-pixel in a white display state and controls a second liquid crystal sub-pixel corresponding to the second electroluminescence sub-pixel in a black display state.

19. The display according to claim 13, wherein the controller inactivates the EL panel driver so that the electroluminescence panel is not driven when the display is in a relatively bright condition.

20. The display according to claim 13, wherein the controller activates the EL panel driver to drive the electroluminescence panel when the display is in a relatively dark condition.

* * * * *

UNITED STATES PATENT AND TRADEMARK OFFICE
CERTIFICATE OF CORRECTION

| | | |
|---|---|---|
| PATENT NO. | : 7,034,911 B2 | Page 1 of 1 |
| APPLICATION NO. | : 10/887126 | |
| DATED | : April 25, 2006 | |
| INVENTOR(S) | : Yoshifumi Kato | |

It is certified that error appears in the above-identified patent and that said Letters Patent is hereby corrected as shown below:

Column 1, lines 49-50, please delete "provides, a display" and insert therefor -- provides a display--;

Column 2, line 3, please delete "the present is" and insert therefor --the present invention is--; and Column 8, line 11, please delete "EL, panel 12" and insert therefor -- EL panel 12--.

Signed and Sealed this

Seventh Day of August, 2007

JON W. DUDAS
*Director of the United States Patent and Trademark Office*